United States Patent [19]

Namba et al.

[11] Patent Number: 5,249,896
[45] Date of Patent: Oct. 5, 1993

[54] APPARATUS FOR MANUFACTURING LOST FOAM PATTERN FOR USE IN FULL-MOLD CASTING

[75] Inventors: Takaoki Namba; Teruo Kamada, both of Saitama, Japan

[73] Assignee: Honda Giken Kogyo Kabushiki Kaisha, Tokyo, Japan

[21] Appl. No.: 969,767

[22] Filed: Oct. 30, 1992

Related U.S. Application Data

[62] Division of Ser. No. 872,441, Apr. 23, 1992, Pat. No. 5,197,527.

[30] Foreign Application Priority Data

Apr. 23, 1991 [JP] Japan .................. 3-119510
Jul. 3, 1991 [JP] Japan .................. 3-189366

[51] Int. Cl.⁵ .................................................. B23C 3/00
[52] U.S. Cl. .................................. 409/191; 409/137; 409/159
[58] Field of Search ............... 164/45; 409/137, 158, 409/159, 160, 163, 172, 183, 190, 191

[56] References Cited

U.S. PATENT DOCUMENTS

| | | | |
|---|---|---|---|
| 3,010,371 | 11/1961 | Riedel et al. | 409/158 |
| 3,371,580 | 3/1968 | Barnes et al. | 409/191 |
| 4,603,456 | 8/1986 | Hiroyasu et al. | 409/158 |
| 5,084,952 | 2/1992 | Grabow | 409/159 |
| 5,197,527 | 3/1993 | Namba et al. | 164/45 |

FOREIGN PATENT DOCUMENTS

| | | | |
|---|---|---|---|
| 88113 | 3/1990 | Japan | 409/137 |
| 32546 | 2/1991 | Japan | 409/137 |

Primary Examiner—Daniel W. Howell
Attorney, Agent, or Firm—Irving M. Weiner; Joseph P. Carrier; Pamela S. Burt

[57] ABSTRACT

A pit defining a machining cavity is positioned downstream of a loading conveyor. A workpiece such as a foam block to be machined into a lost foam pattern for use in full-mold casting is fixedly mounted on an invertable workpiece mount base that is positioned above the machining cavity. The machining cavity houses a cutting unit for cutting, from below, the foam block supported on the workpiece mount base. Chips produced when the foam block is cut by the cutting unit are discharged by a chip discharger disposed beneath the machining cavity. The machining cavity can be substantially closed by the workpiece mount base or the foam block mounted thereon. There may be employed upstream and downstream machining stations each having the machining cavity, the workpiece mount base, and the cutting unit. The workpiece mount base in the upstream machining station is vertically movable, and the upstream and downstream machining stations are interconnected by transfer units. After one side of the foam block has been cut by the cutting unit in the upstream machining station, the foam block is elevated and then transferred to the downstream machining station in which the opposite side of the foam block is cut by the cutting unit.

7 Claims, 14 Drawing Sheets

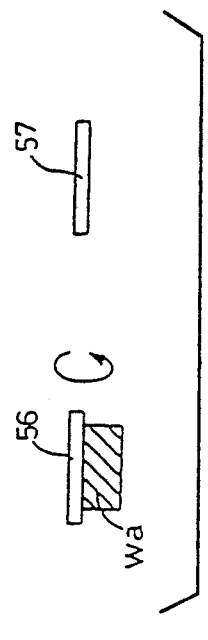
FIG. 12(a)
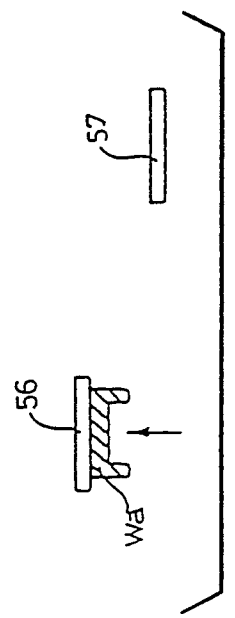
FIG. 12(b)
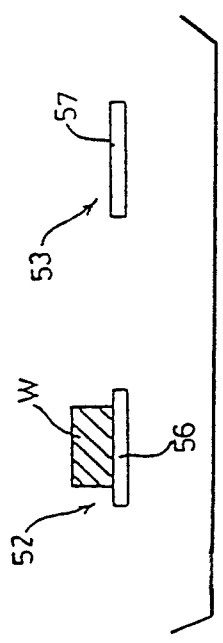
FIG. 12(c)
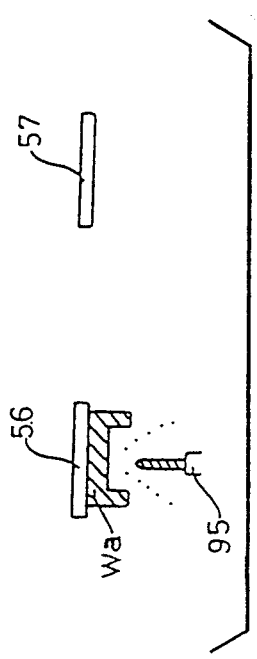
FIG. 12(d)
FIG. 12(e)
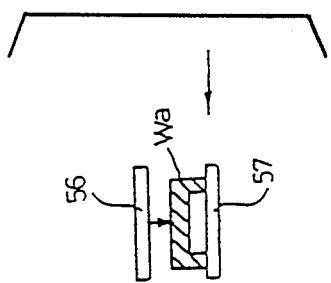

5,249,896

APPARATUS FOR MANUFACTURING LOST FOAM PATTERN FOR USE IN FULL-MOLD CASTING

This is a divisional of application Ser. No. 07/872,441 filed Apr. 23, 1992, now U.S. Pat. No. 5,197,527.

BACKGROUND OF THE INVENTION

Field of the Invention

The present invention relates to an apparatus for machining a lost foam pattern which is to be used in full-mold casting to produce a mold.

Description of the Relevant Art

In full-mold casting, an expendable foam pattern in the same shape as a mold to be produced is placed in foundry sand such as resin sand or the like, and molten metal is poured into the foam block. The foam block is vaporized by the poured molten metal, which is then cast as a mold having a shape identical to that of the foam block.

To manufacture such a foam pattern, a foam block is cut to a desired shape usually with a vertical open-type machine tool. The vertical open-type machine tool has a cutter head positioned above a foam block as a workpiece that is positioned on a workpiece table. The cutter head is moved based on NC data to cut an upper surface of the workpiece to a desired shape.

After the upper surface of the workpiece has been cut, the workpiece on the workpiece table is inverted, and a lower surface thereof is cut by the cutter head.

Since the cutter head is required to be positioned upwardly of the workpiece, the vertical open-type machine tool is relatively large in size as it needs a rigid mount base for supporting the cutter head. The vertical open-type machine tool is also complex because it is necessary to invert the workpiece manually or with a workpiece inverting device. Furthermore, inasmuch as the workpiece is cut at its upper surface, chips produced from the workpiece by the cutter head tend to be accumulated around the machined region around the upper surface of the workpiece, making the working environment less than optimum. The environmental sanitary conditions for the operator of the machine tool are lowered by chips scattered from the workpiece.

A machining apparatus capable of machining upper, lower, and side surfaces of a workpiece is known from Japanese laid-open patent publication No. 2-109663, for example. The disclosed apparatus has a box surrounding a workpiece. The workpiece is machined within the box so that chips and cutting oil are prevented from being scattered around. When an upper surface of the workpiece is machined, however, chips tend to accumulate on the upper surface of the workpiece and cannot fully be removed therefrom.

According to the conventional machining apparatus, in addition, since all necessary surfaces of a workpiece are machined on one machine tool, the time in which the machine tool is occupied by one workpiece is so long that the yield of machined workpieces is low. Stated otherwise, until a workpiece mounted on a workpiece table is fully machined and removed from the workpiece table, a next workpiece cannot be supplied to and clamped in the machine tool.

There has been a demand for a machining system capable of machining workpieces smoothly along a series of machining steps with a reduced expenditure of manual labor for an increased rate of production.

SUMMARY OF THE INVENTION

In view of the aforesaid drawbacks of the conventional machining apparatus for cutting lost foam patterns, it is an object of the present invention to provide a method of and an apparatus for machining a lost foam pattern smoothly in a series of machining steps within a relatively small space, while removing chips produced from the lost foam pattern for an improved working environment and environmental sanitary conditions.

According to the present invention, there is provided an apparatus for machining a foam block into an expendable lost foam pattern for use in full-mold casting, comprising mount means for supporting and orienting a foam block, a pit defining a cavity below the positioning means, and cutting means disposed in the cavity, for cutting, from below, the foam block supported and oriented by the mount means, the cutting means having three degrees of freedom with respect to the mount means.

The apparatus further includes discharging means beneath the cavity, for discharging chips produced when the foam block is cut by the cutting means. The mount means comprises a workpiece mount base for placing the foam block thereon, the workpiece mount base including fixing means for fixing the foam block, and an inverting mechanism for inverting the workpiece mount base about an axis.

After the foam block has been fixed to the workpiece mount base, the mount base is inverted to face a side of the foam block downwardly, and the downwardly facing side of the foam block is cut by the cutting means that is movable three-dimensionally. Chips produced when the foam block is cut by the cutting means fall and are prevented from being accumulated around the cutting means. The chips are discharged by the discharging means.

The cavity is substantially closable by the workpiece mount base or the foam block placed on the workpiece mount base. The chips are therefore confined in the cavity and do not scatter out of the cavity. Consequently, the working environment is not degraded by chips which would otherwise scatter around, and the environmental sanitary conditions for the operators of the apparatus are improved.

The apparatus comprises a plurality of pits each defining the cavity, and a plurality of machining stations disposed in the pits, respectively, each of the machining stations comprising the cutting means.

The apparatus further includes means in at least one of the machining stations, for vertically moving the foam block, and transfer means interconnecting adjacent ones of the machining stations, for transferring the foam block between the adjacent machining stations.

A foam block is fixed to the workpiece mount base in one of the machining stations. Then, the workpiece mount base with the foam block is inverted, and one side of the foam block on the inverted workpiece mount base is cut by the cutting means. Thereafter, the foam block is elevated and transferred from the machining station to an adjacent machining station in which the foam block is fixed to the workpiece mount base in the adjacent machining station. The workpiece mount base is inverted, and an opposite side of the foam block on the inverted workpiece mount base is cut by the cutting means in the adjacent machining station. Therefore, the foam block can smoothly and efficiently be cut on both of its sides in the machining stations.

While a foam block is being machined in one of the machining stations, a next foam block can be loaded and fixed in position in another machining station. Accordingly, the overall rate of production of the apparatus is relatively high.

In the case where foam blocks are automatically elevated and transferred between the machining stations, the foam blocks can be machined without an expenditure of manual labor which would otherwise be necessary.

The above and further objects, details and advantages of the present invention will become apparent from the following detailed description of preferred embodiments thereof, when read in conjunction with the accompanying drawings.

BRIEF DESCRIPTION OF THE DRAWINGS

FIGS. 12(a) through 12(i) are schematic views illustrative of a different operation sequence.

DETAILED DESCRIPTION OF THE PREFERRED EMBODIMENTS

Machining apparatus according to the present invention are particularly useful when embodied as apparatus for machining an expendable foam block into a lost foam pattern having the same shape as a mold that is to be produced in full-mold casting.

Figure 1:
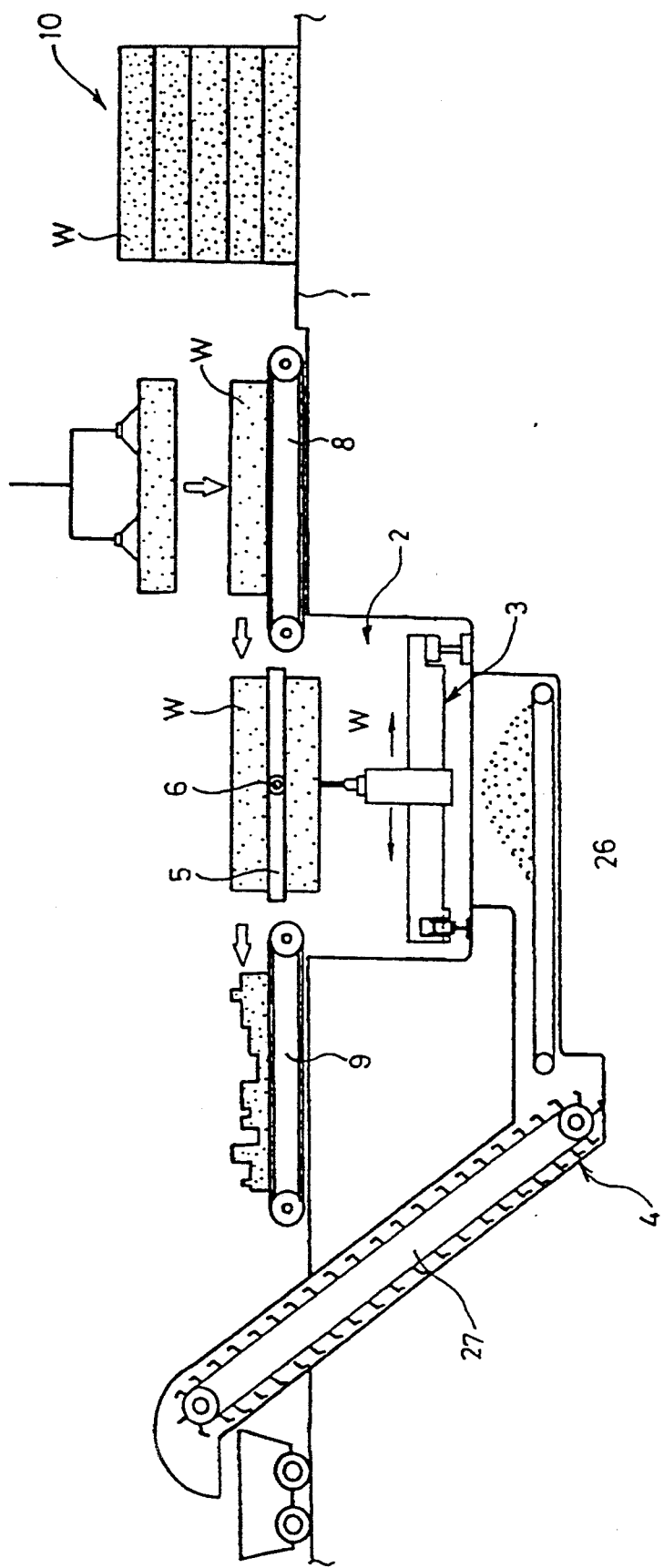
FIG. 1 is a schematic side elevational view of a machining apparatus according to a first embodiment of the present invention.

According to a first embodiment of the present invention, as shown in FIG. 1, a machining apparatus has a machining cavity or space 2 in a pit P defined in a floor 1, a cutting unit 3 disposed in the machining cavity 2, a chip discharger 4 for discharging chips T accumulated below the machining cavity 2, and a workpiece mount base 5 disposed above the machining cavity 2.

The workpiece mount base 5 has a workpiece fixing means (described later), and can be inverted 180° or tuned upside down about shafts 6a, 6b (see also FIG. 3) extending perpendicularly to the sheet of FIG. 1. Loading and unloading conveyors 8, 9 are positioned upstream and downstream, respectively, of the workpiece mount base 5 with respect to the direction in which workpieces are fed over the machining cavity 2. The loading and unloading conveyors 8, 9 have ends disposed near the workpiece mount base 5, thus providing a workpiece feed path.

Foam blocks W stacked in a stock area 10 are transferred one by one onto the loading conveyor 8 by a transfer unit 11 which comprises a plurality of suction cups. When a foam block W transferred onto the loading conveyor 8 is loaded onto the workpiece mount base 5, it is fixed to the workpiece mount base 5 by the workpiece fixing means. Then, the fixed foam block W is inverted about the shafts 6a, 6b into an inverted position Wa in which the foam block W is machined by the cutting unit 3 from below. After the foam block W is machined, it is inverted again, and unloaded from the workpiece mount base 5 onto the unloading conveyor 9. Foam blocks W are successively loaded by the loading conveyor 8, machined by the cutting unit 3, and unloaded by the unloading conveyor 9.

Figure 2:
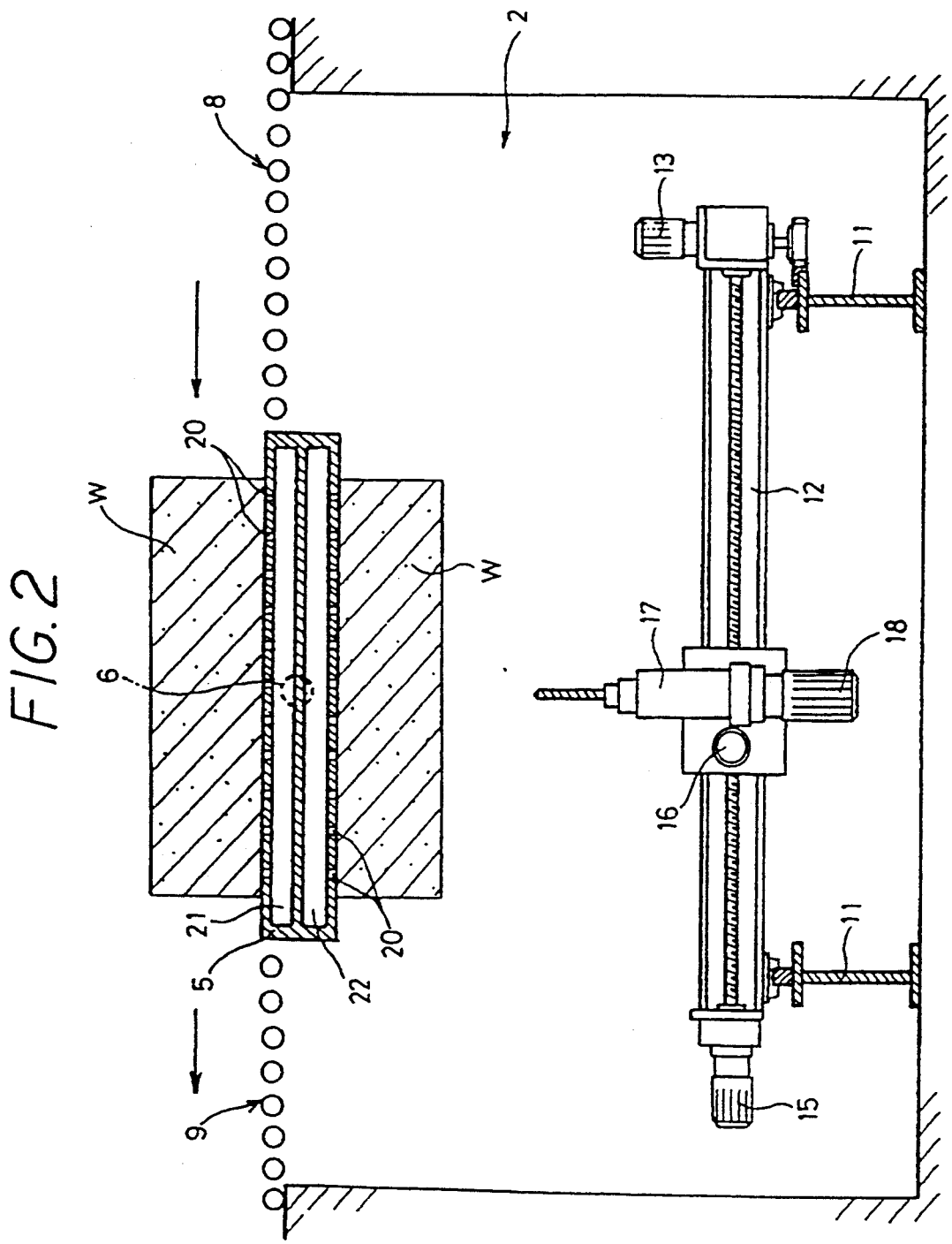
FIG. 2 is an enlarged side elevational view, partly in cross section, of a machining cavity of the machining apparatus shown in FIG. 1.

The loading and unloading conveyors 8, 9 are in the form of belt conveyors having respective endless belts 8b, 9b trained around pulleys 8a, 9a. However, the loading and unloading conveyors 8, 9 may be roller conveyors comprising rollers 8c, 9c as shown in FIG. 2, or may be any of various other known conveyors.

The cutting unit 3 will be described below with reference to FIGS. 2 and 3.

The cutting unit 3 comprises a pair of transversely elongate support columns 13 mounted on the bottom of the machining cavity 2, a pair of guide rails 15 mounted on and extending along respective support plates 14 on the support columns 13, and an X-axis mobile unit 16 movably mounted on the guide rails 15. The X-axis mobile unit 16 comprises a horizontally elongate frame 16a extending perpendicularly to and supported on the guide rails 15, a ball screw shaft 16b disposed in and extending along the frame 16a, and a pair of sliders 16c attached to the frame 16a in slidable engagement with the guide rails 15.

Figure 3:
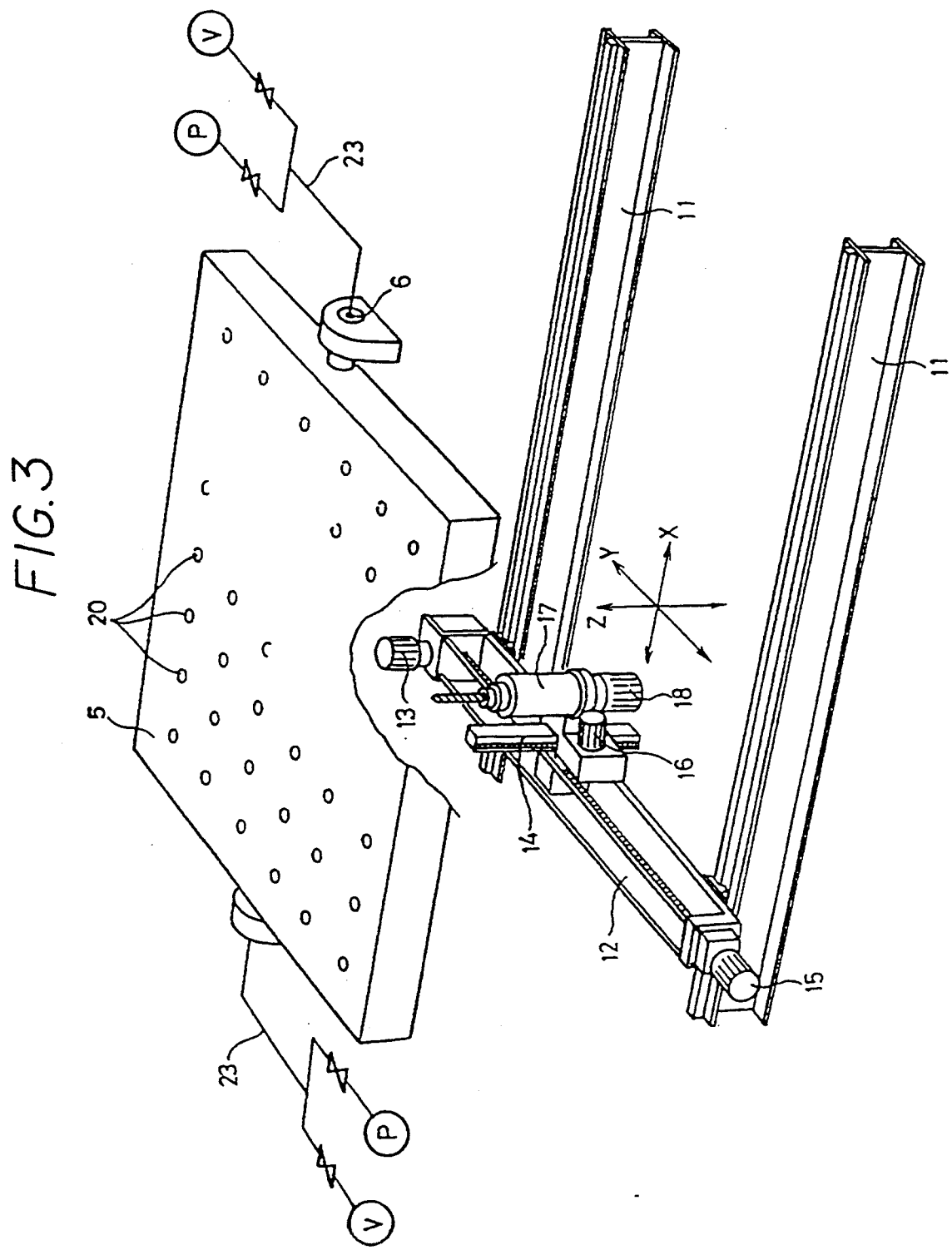
FIG. 3 is a fragmentary perspective view of a workpiece mount base and a cutting unit of the machining apparatus shown in FIG. 1.

An X-axis motor 17 is mounted on one end of the frame 16a for moving the X-axis mobile unit 16 along the guide rails 15 in the direction of an X-axis, as shown in FIG. 3. As shown in FIG. 2, an output shaft 17b is coupled through a speed reducer 17a to the X-axis motor 17 and supports a pinion 18 on its lower end which is held in mesh with a rack 19 mounted on one side of one of the support plates 14. Therefore, when the X-axis motor 17 is energized, the X-axis mobile unit 16 moves along the guide rails 15 in the X-axis direction.

As shown in FIG. 3, a Y-axis mobile unit 21 is mounted on a front side of the X-axis mobile unit 16. The Y-axis mobile unit 21 comprises a vertically elongate body 21a and a threaded member 21b coupled to and disposed behind the body 21a, the threaded member 21b being threaded over the ball screw shaft 16b. When the ball screw shaft 16b rotates about its own axis, the Y-axis mobile unit 21 moves along the frame 16a in the direction of a Y-axis which is normal to the X-axis direction. The ball screw shaft 16b has one end coupled through a speed reducer 22a to a Y-axis motor 22 that is mounted on the other end of the frame 16a.

A Z-axis mobile unit 23 is mounted on the Y-axis mobile unit 21. The Z-axis mobile unit 23 comprises a vertically movable body 23a that is vertically movable along the body 21a of the Y-axis mobile unit 21, and a Z-axis motor 24 mounted on a front side of the body 23a. The body 23a houses a pinion therein which is held in mesh with a vertical rack 20 fixed to a side of the body 21a of the Y-axis mobile unit 21. Therefore, when the Z-axis motor 24 is energized, the Z-axis mobile unit 23 vertically moves along the body 21a in the direction of a Z-axis.

A cutter unit 25 is mounted on a front side of the Z-axis mobile unit 23. The cutter unit 25 includes a cutter bit 25a on its upper end and a motor 26 on its lower end for rotating the cutter bit 25a. Since the cutter unit 25 is supported by the X-, Y-, and Z-axis mobile units 16, 21, 23, the cutting unit 25 is movable three-dimensionally along the three X-, Y-, and Z-axes that extend perpendicularly to each other, i.e., the cutting unit 25 has three degrees of freedom. While the cutter unit 25 is moving three-dimensionally, the cutter bit 25a machines or cuts chips off a foam block W supported on the workpiece mount base 5 and held in the inverted position Wa.

The three-axis mobile system for moving the cutter bit 25a three-dimensionally may be of any of various known mechanisms other than the illustrated combination of pinions, racks, and a ball screw shaft.

The workpiece mount base 5 with its workpiece fixing means will be described below.

The workpiece mount base 5, which can be inverted about the shafts 6a, 6b as described above, is of a hollow structure having a number of air suction holes 30 defined in its upper and lower panels for attracting and securely holding foam blocks W under a vacuum. As shown in FIG. 2, the workpiece mount base 5 has two vertically independent hollow chambers 31, 32 defined therein for developing a vacuum therein to attract foam blocks W separately to the upper and lower panels, respectively.

As illustrated in FIG. 3, a pair of vacuum/pressure selector circuits 33, each having a vacuum source V and a pressure source P connected through respective valves 34, is held in communication with the respective chambers 31, 32 through the respective shafts 6a, 6b. The shafts 6a, 6b are rotatably supported by respective bearings 35a, 35b supported on the floor 1, and have their axes extending perpendicularly to the workpiece feed path as shown in FIGS. 1 through 3. Alternatively, the shafts 6a, 6b may be arranged such that their axes extend parallel to the workpiece feed path.

The workpiece fixing means is not limited to the illustrated structure. Since the foam blocks W are light in weight, they may be fixed to the workpiece mount base 5 by double-faced adhesive tapes. Alternatively, foam blocks W may be fixed to the workpiece mount base 5 by being pierced by needles mounted on the workpiece mount base 5.

The size and shape of the workpiece mount base 5 are substantially the same as the size and shape, respectively, of the upper opening of the machining cavity 2. Therefore, when the workpiece mount base 5 lies parallel to the floor 1, the workpiece mount base 5 covers the upper opening of the machining cavity 2, thus closing the machining cavity 2 by itself or in combination with the loading and unloading conveyors 8, 9. Accordingly, chips produced when foam blocks W are machined by the cutting unit 3 are prevented from scattering out of the machining cavity 2, with the result that the working environment and environmental sanitary conditions for the operators are improved.

The machining cavity 2 may be closed by foam blocks W themselves. In this case, the workpiece mount base 5 may not necessarily be of a closed panel structure, but may be of an open frame structure. Since such an open frame structure does not allow the use of the suction-type workpiece fixing means, double-faced adhesive tapes, needles, or other workpiece fixing means should be employed to retain foam blocks W on the workpiece mount base.

Figure 4:
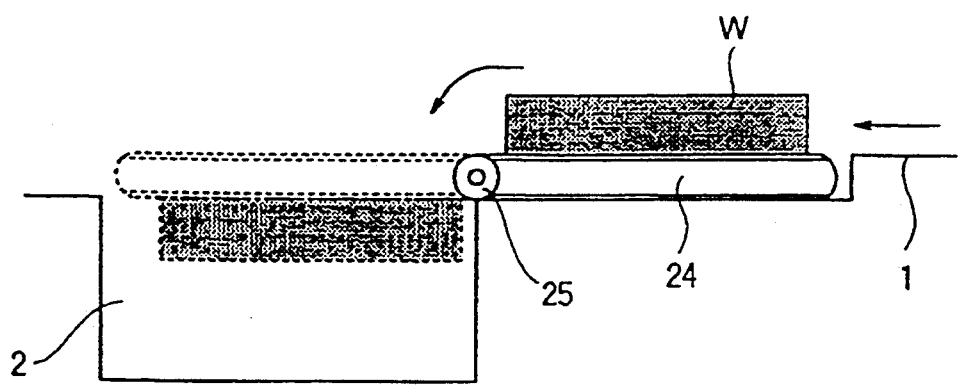
FIG. 4 is a side elevational view of another workpiece mount base.

FIG. 4 shows another workpiece mount base 36 that is a cantilevered, hinged mount base which can be inverted about a hinge 37. When the workpiece mount base 36 is inverted, the workpiece mount base 36 and a foam block W supported thereon are turned into broken-line positions 36a, Wa, respectively, with their previously upper surfaces facing downwardly into the machining cavity 2.

The chip discharger 4 will be described below.

As shown in FIG. 1, the chip discharger 4 is disposed in a chip discharge tunnel Q formed below the floor 1. The chip discharge tunnel Q includes a straight path Qa formed below the machining cavity 2 parallel to the floor 1 and having an end communicating with the machining cavity 2, and a slanted path Qb communicating with the other end of the straight path Qa and having an upper end opening at the floor 1.

The chip discharger 4 comprises a chip feeder conveyor 40 disposed in the straight path Qa. The chip feeder conveyor 40 comprises a belt conveyor including an endless belt 40b trained around pulleys 40a, for conveying chips T accumulated on the belt 40b toward a downstream chip collector conveyor 41.

The chip collector conveyor 41 is disposed in the slanted path Qb, and comprises a bucket conveyor having a plurality of spaced buckets 41c mounted on an endless chain 41b trained around sprockets 41a. The chip collector conveyor 41 has a lower end positioned near one end of the chip feeder conveyor 40 and an upper end projecting above the floor 1.

The chip feeder conveyor 40 and the chip collector conveyor 41 may be of any of various known conveyors, such as screw conveyors.

Chips T produced from foam blocks W by the cutting unit 3 and falling downwardly of the machining cavity 2 are discharged by the chip feeder conveyor 40 and the chip collector conveyor 41, and collected by a chip truck 42.

The machining apparatus operates as follows:

Foam blocks W stacked in the stock area 10 are transferred one by one onto the loading conveyor 8 by the transfer unit 11. A foam block W on the loading conveyor 8 is then loaded onto the workpiece mount base 5 and fixed thereto by the workpiece fixing means under a vacuum. Thereafter, the workpiece mount base 5 is inverted to bring the foam block W into the inverted position Wa in which the foam block W is machined to a desired shape by the cutting unit 3.

Chips T produced from the foam block W fall onto the chip feeder conveyor 40 below the machining cavity 2, and hence are prevented from being accumulated in the machining cavity 2 around the cutting unit 3. The chips T are also prevented from scattering out of the machining cavity 2 as it is substantially closed. The chips T that have fallen onto the chip feeder conveyor 40 are then discharged by the chip collector conveyor 41 and collected by the chip truck 42. The machined foam block W is unloaded by the unloading conveyor 9, and a new foam block W from the stock area 10 is placed on and fixed to the workpiece mount base 5.

Figure 5:
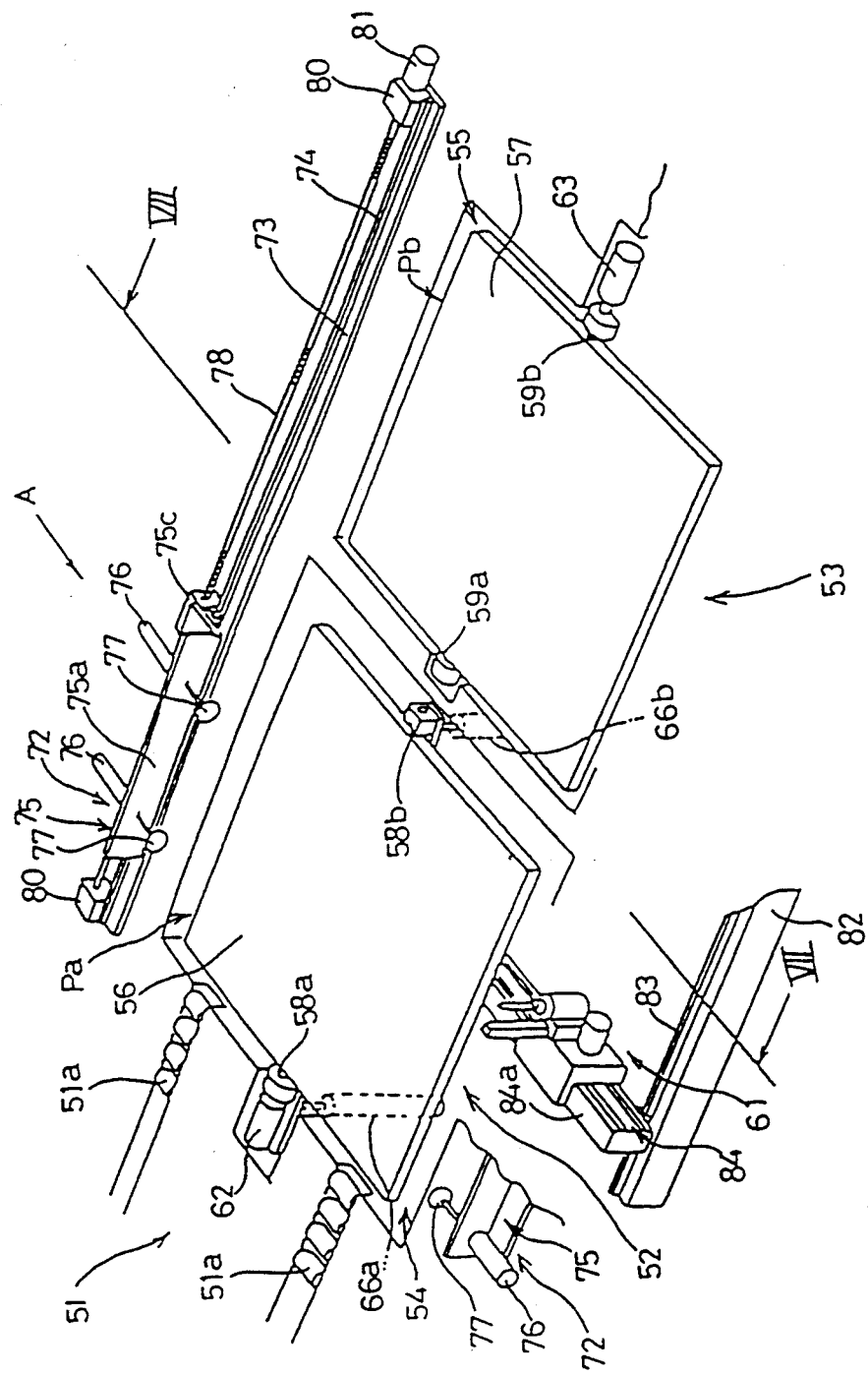
FIG. 5 is a schematic perspective view of a machining apparatus according to a second embodiment of the present invention.
Figure 6:
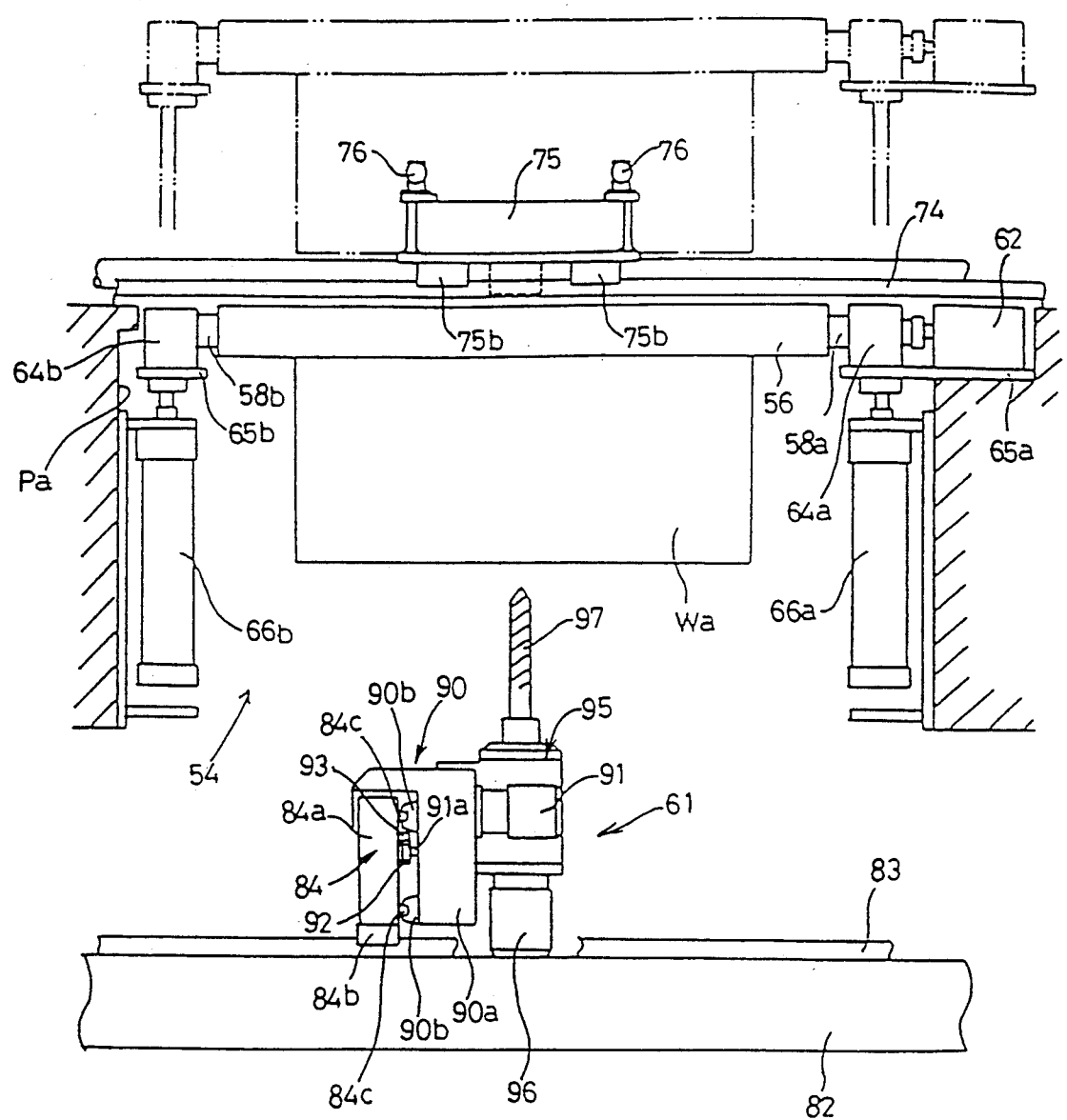
FIG. 6 is an enlarged fragmentary view as viewed in the direction indicated by the arrow A in FIG. 5.
Figure 7:
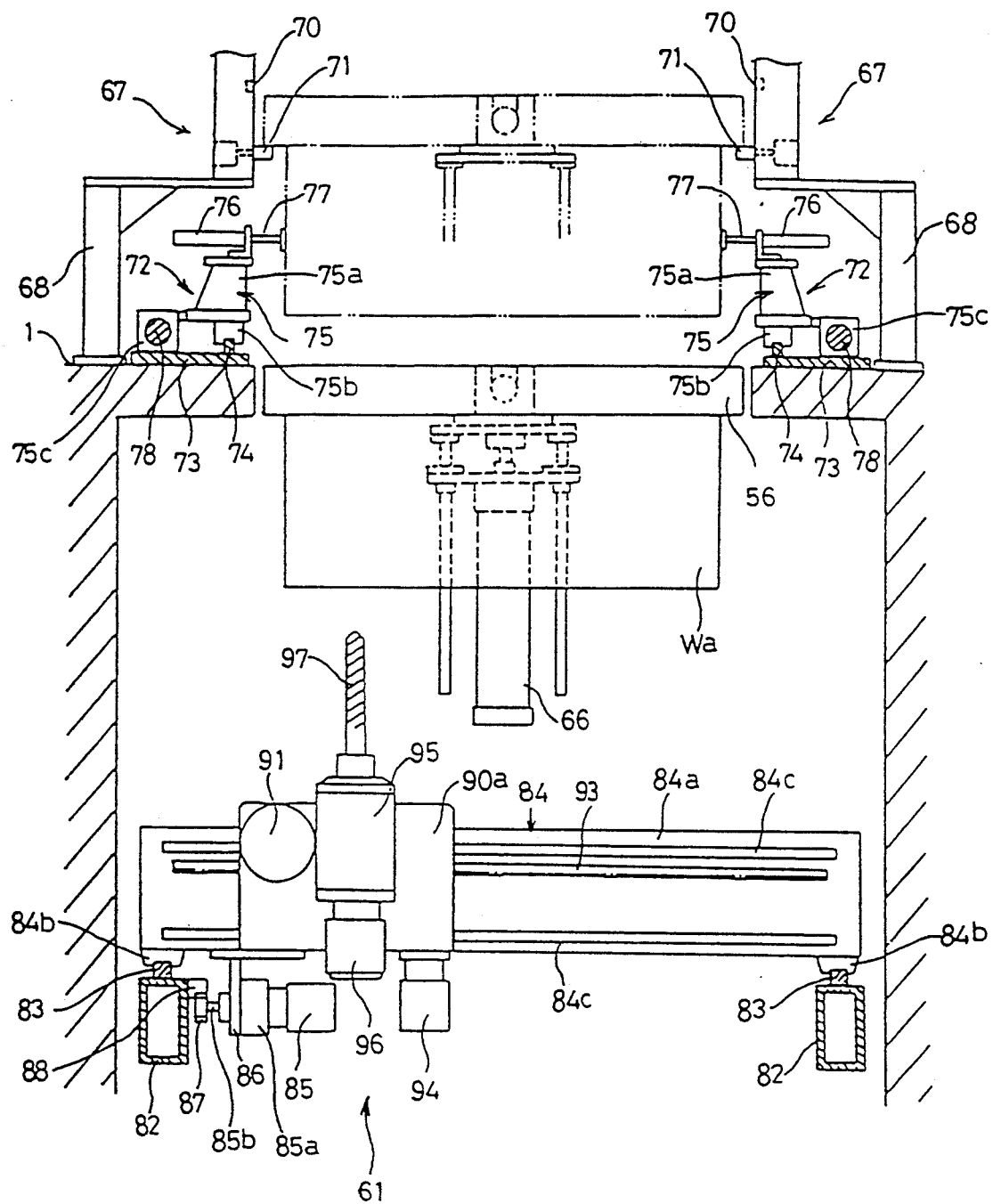
FIG. 7 is an enlarged cross-sectional view taken along line VII—VII of FIG. 5.

FIGS. 5 through 7 show a machining apparatus according to a second embodiment of the present invention.

As shown in FIG. 5, a loading conveyor 51 for loading foam blocks W is positioned on the left side, as shown, and feeds one foam block W, at a time, from the left to the right. Two pits Pa, Pb are formed in a floor 1 at a terminal end of the loading conveyor 51 in alignment therewith, and accommodate two machining stations 52, 53, respectively. One side of the foam block W is machined in the machining station 52 near the loading conveyor 51, and thereafter the other side of the foam block W is machined in the machining station 53 that is located downstream of the machining station 52 with respect to the workpiece feed path along the loading conveyor 51. The loading conveyor 51 is in the form of a roller conveyor having two rows of rollers 51a for feeding foam blocks W thereon. An unloading conveyor (not shown) is disposed downstream of the machining station 53 for unloading foam blocks W that have been machined in the machining station 53.

Each of the machining stations 52, 53 is of substantially the same structure as the workpiece mount base 5 and the cutting unit 3 of the machining apparatus according to the first embodiment. More specifically, the pits Pa, Pb define respective machining cavities 54, 55 therein, and workpiece mount bases 56, 57 are disposed above the machining cavities 54, 55, respectively. The workpiece mount bases 56, 57 can be inverted about shafts 58a, 58b and 59a, 59b, respectively, whose axes extend parallel to the loading conveyor 51. The machining stations 52, 53 have respective cutting units 61 disposed in the machining cavities 54, 55. The cutting unit in the machining cavity 55 is omitted from illustration. Each of the machining units 61 is movable three-dimensionally along three perpendicular axes by a moving mechanism that is slightly different from that shown in FIGS. 2 and 3, as described later on.

Rotary actuators 62, 63 coupled to the respective shafts 58a, 59b are disposed on sides of the workpiece mount bases 56, 57, respectively. The upstream workpiece mount base 56 is vertically movable. As shown in FIG. 6, the shafts 58a, 58b are rotatably supported by respective bearings 64a, 64b that are coupled through respective support plates 65a, 65b to respective cylinder units 66a, 66b that are fixed to respective side walls of the pit Pa. When the cylinder units 66a, 66b are extended, the workpiece mount base 56 is elevated, together with the shafts 58a, 58b and the rotary actuator 62, to a position indicated by the two-dot-and-dash lines in FIG. 6. The elevated workpiece mount base 56 is locked in the elevated position by stoppers (described later on).

The workpiece mount bases 56, 57 have suction-type workpiece fixing means (not shown) which are of the same type as the workpiece fixing means described above with respect to the first embodiment. However, various other workpiece fixing means may be employed instead of suction-type workpiece fixing means.

Locking mechanisms 67 for holding the workpiece mount base 56 in the elevated position will be described below.

The locking mechanisms 67 are positioned above the machining station 52. As shown in FIG. 7, the locking mechanisms 67 are identical in shape and symmetrically mounted on respective support columns 68 vertically mounted on the floor 1. The locking mechanisms 67 have stoppers 71 movable toward and away from each other under the control of signals from sensors 70. Specifically, when the workpiece mount base 56 is elevated, the sensors 70 detect the workpiece mount base 56 and control the stoppers 71 to move from a retracted position into a projected position beneath the elevated workpiece mount base 56, thus supporting the elevated workpiece mount base 56. When the workpiece mount base 56 is to be lowered, the workpiece mount base 56 is slightly lifted from the elevated position, and then the sensors 70 control the stoppers 71 to move into the retracted position. Since the stoppers 71 are retracted clear out of the way, the workpiece mount base 56 can subsequently be lowered.

A pair of transfer units 72 between the machining stations 52, 53 will be described below.

As shown in FIGS. 5 through 7, the transfer units 72 comprise respective base plates 73 mounted on the floor 1 inwardly of the support columns 68, respective rails 74 mounted on the base plates 73 and interconnecting the machining stations 52, 53, and respective transfer bodies 75 having respective sliders 75b slidingly engaging the rails 74, respectively. The transfer bodies 75 include respective bases 75a which support grippers 77 movable in directions normal to the rails 74 by cylinders 76. The grippers 77 may have elastomeric members as of rubber at their distal ends or may have pointed distal ends. When the grippers 77 of the transfer units 72 are moved toward each other, they are held against opposite sides of a foam block W, gripping the foam block W therebetween.

The transfer units 72 have respective shaft screws 78 extending parallel to the respective rails 74 and having opposite ends rotatably supported by bearings 80. Ends of the shaft screws 78 are coupled to respective motors 81 which rotate the shaft screws 78 about their own axes. The transfer bodies 75 have threaded members 75c, respectively, which are threaded over the shaft screws 78. Therefore, when the motors 81 are energized, the shaft screws 78 are rotated about their own axes to move the transfer bodies 75 along the rails 74, respectively, between the machining stations 52, 53.

The cutting units 61 will be described below.

The cutting units 61 are identical to each other, and hence only one of the cutting units 61 will be described. As shown in FIGS. 5 through 7, the cutting unit 61 comprises a pair of guide rail bases 82 mounted on the bottom of the machining cavity, a pair of guide rails 83 mounted respectively on the guide rail bases 82, and an X-axis mobile unit 84 movably mounted on the guide rails 83. The X-axis mobile unit 84 comprises a beam 84a in the form of a rectangular prism extending between and supported on the guide rails 83, and a pair of sliders 84b mounted on the beam 84a and held in slidable engagement with the guide rails 83, respectively. An X-axis motor 85 shown in FIG. 7 is mounted on a bracket 86 extending downwardly from an end portion of the beam 84a. A pinion 87 is mounted on a distal end of an output shaft 85b that is coupled through a speed reducer 85a to the X-axis motor 85. The pinion 87 is held in mesh with a rack 88 mounted on and extending along an inner side of one of the guide raise bases 82. When the X-axis motor 85 is energized, the X-axis mobile unit 84 moves along the guide rails 83 in the direction of an X-axis.

A Y-mobile unit 90 is mounted on a front side of the X-axis mobile unit 84. As shown in FIG. 6, the Y-axis mobile unit 90 has a body 90a and a pair of sliders 90b. The sliders 90b are held in slidable engagement with respective rails 84c on the front side of the beam 84a of the X-axis mobile unit 84. The body 90a supports on its front side a Y-axis motor 91 which is coupled through a speed reducer in the body 90a to an output shaft 91a. The output shaft 91a has on its distal end a pinion 92 held in mesh with a rack 93 mounted on and extending along the front side of the beam 84a. When the Y-axis motor 91 is energized, the Y-axis mobile unit 90 moves along the rails 84c in the direction of a Y-axis normal to the X-axis direction.

A cutting unit 95 mounted on the Y-axis mobile unit 90 is vertically movable by a Z-axis motor 94 through a rack-and-pinion mechanism (not shown). The Z-axis motor 94 is mounted on the body 90a of the Y-axis mobile unit 90. When the Z-axis motor 94 is energized, the cutter unit 95 vertically moves in the direction of a Z-axis normal to both the X- and Y-axis directions. Therefore, the cutting unit 95 is movable three-dimensionally along the X-, Y-, and Z-axes. The cutting unit 95 has a cutter bit 97 on its upper end which is rotatable by a motor 96 on the lower end of the cutting unit 95 for machining or cutting a workpiece.

Chip dischargers, each identical to the chip discharger 4 according to the first embodiment, are located below the respective pits Pa, Pb and extend obliquely upwardly for discharging chips.

The machining cavities 54, 55 are closed by the respective workpiece mount bases 56, 57 or foam blocks W fixedly mounted thereon.

Operation of the machining apparatus according to the second embodiment will be described below with reference to FIGS. 11(a) through 11(i).

Figure 11A:
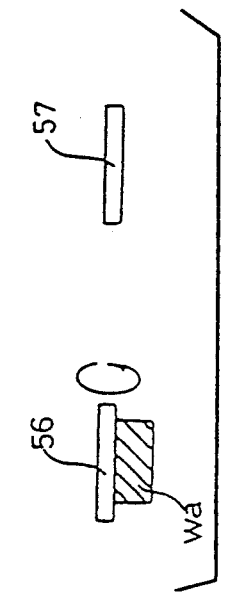
FIGS. 11(a) through 11(i) are schematic views illustrative of an operation sequence of the machining apparatus shown in FIG. 5.
Figure 11B:
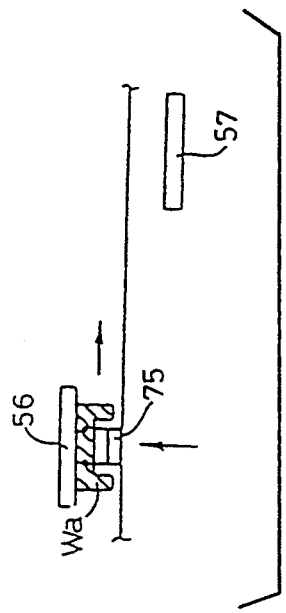
Figure 11C:
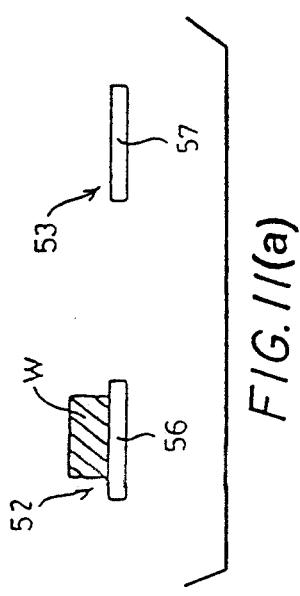

When a foam block W loaded by the loading conveyor 51 is placed on and fixed to the workpiece mount base 56 in the upstream machining station 52, as shown in FIG. 11(a), the workpiece mount base 56 is inverted to bring the fixed foam block W into an inverted position Wa, as shown in FIG. 11(b). One side (facing downwardly) of the foam block W is then cut by the cutting unit 95, as shown in FIG. 11(c).

Figure 11D:
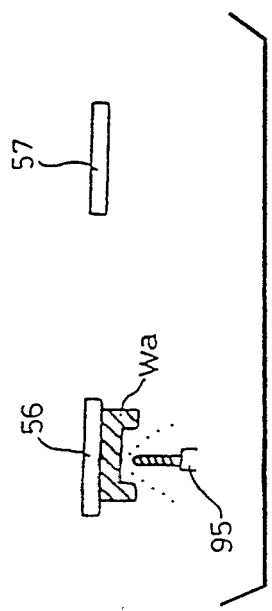

After the foam block W has been machined by the cutting unit 95, the workpiece mount base 56 is elevated by the cylinder units 66a, 66b until it is supported and locked by the stoppers 71 of the locking mechanisms 67. The foam block W is then gripped by the grippers 77 on the transfer bodies 75, which grippers 77 engage the opposite sides of the foam block W, as shown in FIG. 11(d). The cylinder units 66a, 66b are contracted to clear the way of the foam block W to be transferred downstream.

Figure 11E:
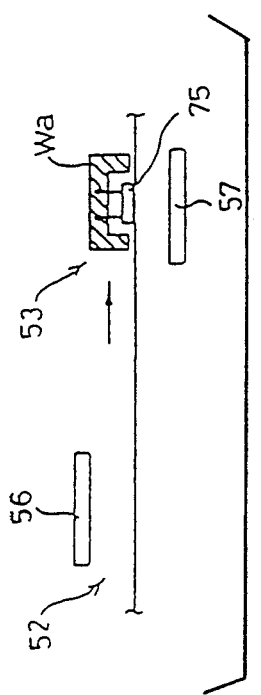
Figure 11F:
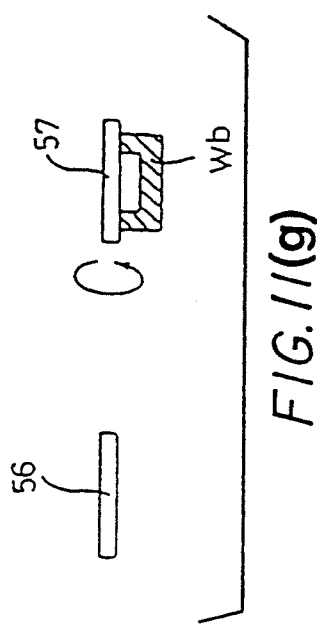
Figure 11G:
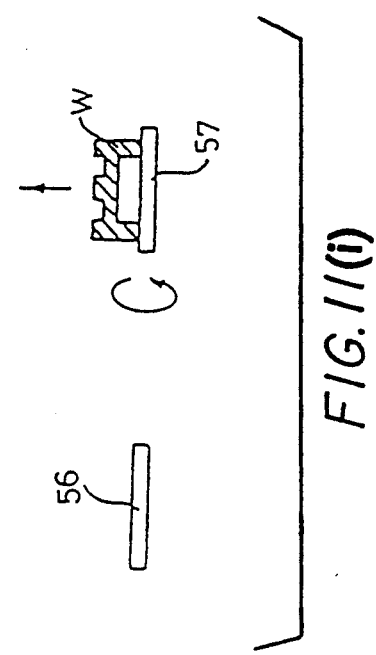
Figure 11H:
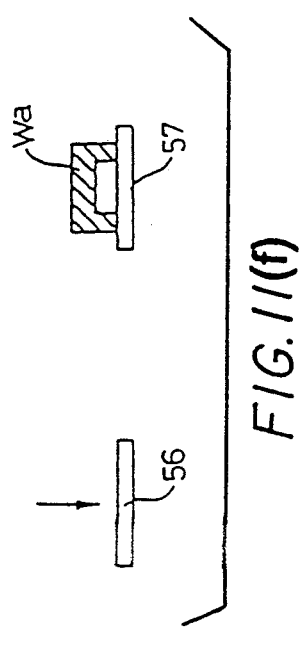
Figure 11I:
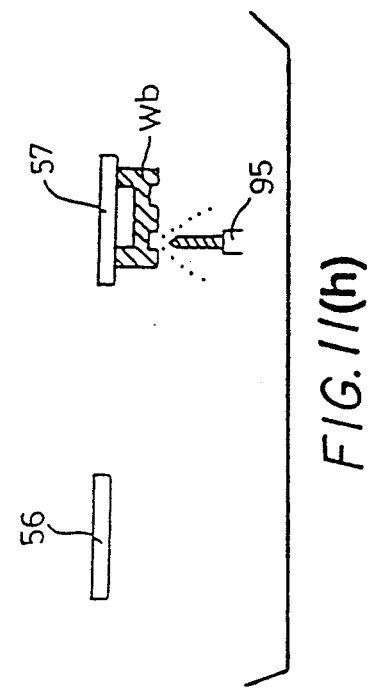

The foam block W held in the inverted position Wa is then transferred by the transfer units 72 from the upstream machining station 52 to the downstream machining station 53, as shown in FIG. 11(e). In the machining station 53, the machined side of the foam block W is fixed to the workpiece mount base 57, and at the same time the workpiece mount base 56 in the machining station 52 is lowered back to its original position, as shown in FIG. 11(f). Thereafter, the workpiece mount base 57 is inverted to bring the foam block W again to an inverted position Wb, as shown in FIG. 11(g). The other side (now facing downwardly) of the foam block W is then cut by the cutter bit of the cutting unit in the machining station 53, as shown in FIG. 11(h). While the foam block W is being cut in the machining station 53, a next foam block W can be loaded onto and fixed to the workpiece mount base 56 in the upstream machining station 52. After the other side of the foam block W has been machined, the workpiece mount base 57 is inverted again, and the foam block W is unloaded from the machining station 53, as shown in FIG. 11(i).

Consequently, the opposite sides of a foam block W can smoothly be machined or cut in the machining stations 52, 53.

Figure 12G:
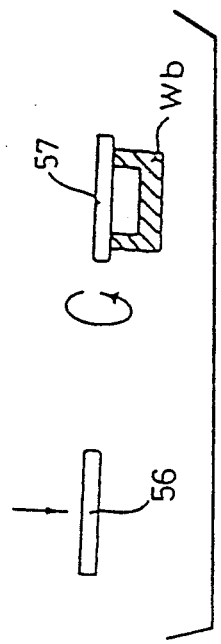
Figure 12I:
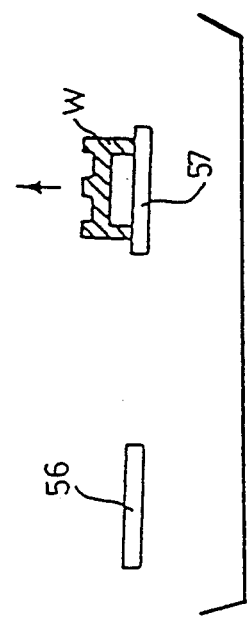
Figure 12F:
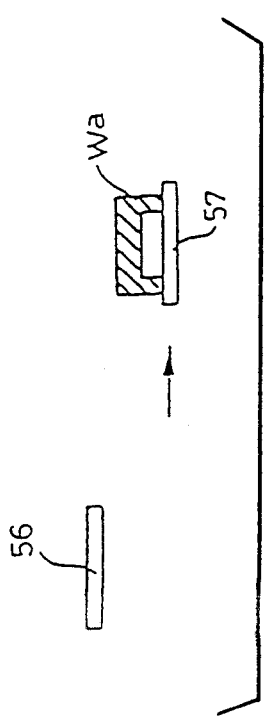
Figure 12H:
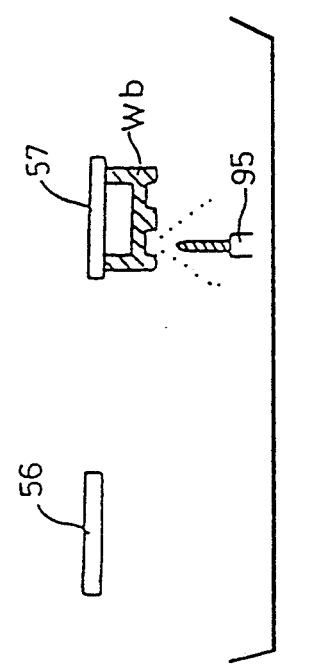

The workpiece mount base 57 in the downstream machining station 53 may be movable so that when the foam block W is transferred from the upstream machining station 52 to the downstream machining station 53, the workpiece mount base 57 moves upstream to receive the foam block W in the upstream machining station 52. More specifically, and with reference to FIG. 12(a)–12(i), the workpiece mount base 57 moves upstream to receive the foam block W in the upstream machining station 52, as shown in FIG. 12(e), and then moves downstream to transfer the foam block W to the downstream machining station 53, as shown in FIG. 12(f). The machining apparatus operates in the same manner as described above with respect to the other processing steps, as shown in FIGS. 12(a) through 12(d) and 12(g) through 12(i).

A machining apparatus according to a third embodiment of the present invention will be described below with reference to FIGS. 8 through 10.

Figure 8:
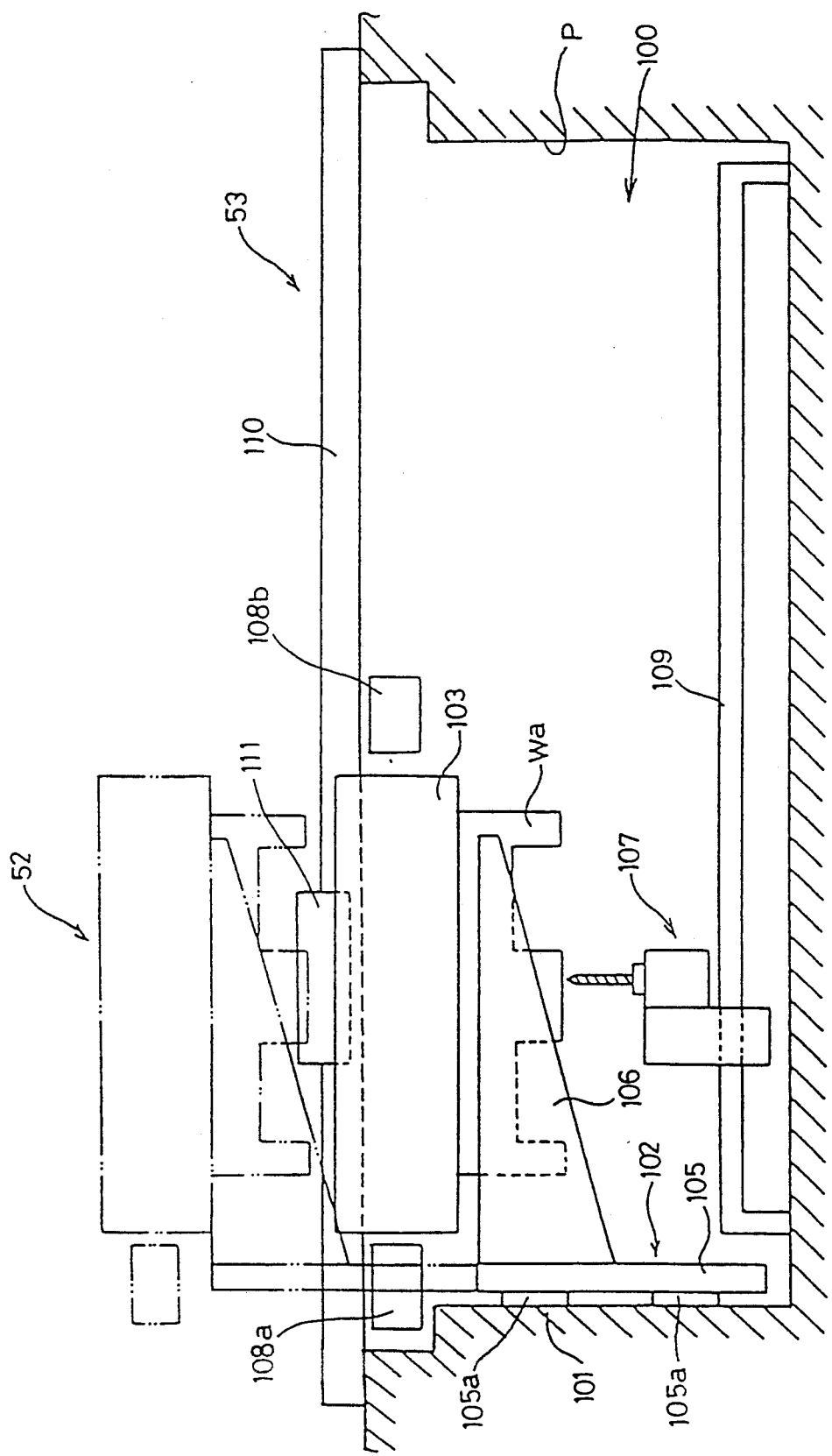
FIG. 8 is a side elevational view of a machining apparatus according to a third embodiment of the present invention.
Figure 9:
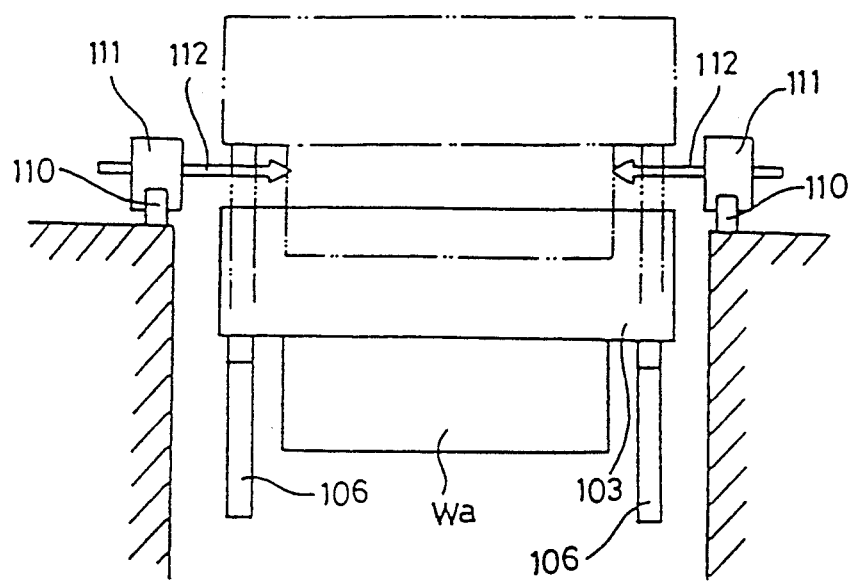
FIG. 9 is a front elevational view of the machining apparatus shown in FIG. 8.
Figure 10:
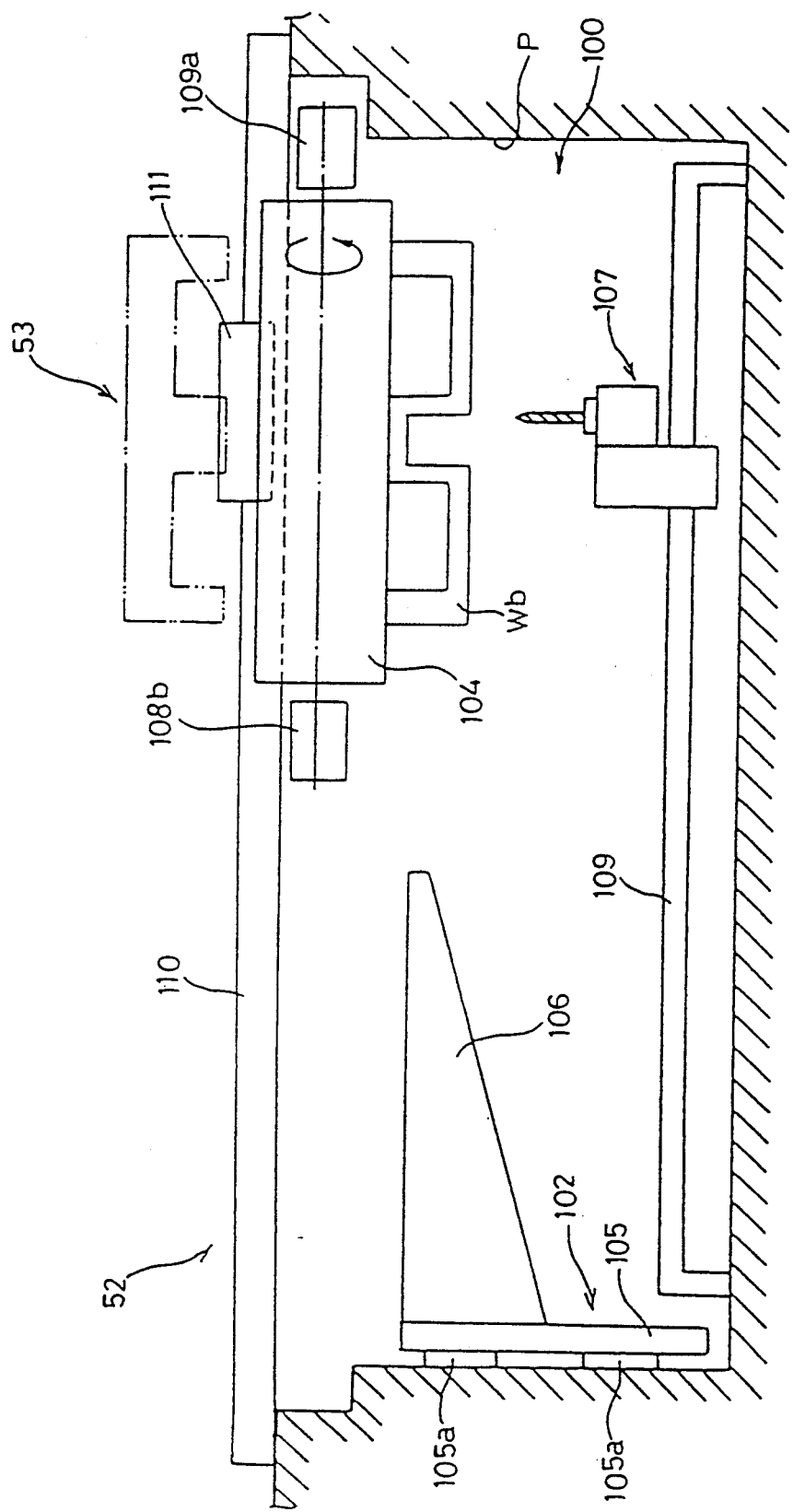
FIG. 10 is a side elevational view showing the manner in which the machining apparatus shown in FIG. 8 operates.

The machining apparatus shown in FIGS. 8 through 10 also has two machining stations 52, 53. In the upstream machining station 52, a workpiece mount base is vertically moved by a lifter mechanism. More specifically, as shown in FIG. 8, the upstream machining station 52 has a workpiece mount base 103 vertically movable by a lifter 102 mounted on one side wall 101 of a machining cavity 100 defined in a pit P. The lifter 102 has a vertically movable plate 105 having sliders 105a slidably engaging rails on the side wall 101, a pair of cantilevered lifter plates 106 extending from the vertically movable plate 105 parallel to the workpiece feed path, and a cylinder unit (not shown) for vertically moving the plate 105. The workpiece mount base 103 has a lower surface whose opposite ends are supported by the lifter plates 106, respectively.

The upstream and downstream machining stations 52, 53 are disposed in the single machining cavity 100 in which a common cutting unit 107 is movable along common guide rails 109 between the upstream and downstream machining stations 52, 53. Since the lifter 102 is mounted on only one side wall 101, there is no cylinder unit or lifter in a central region of the pit P for vertically moving the workpiece mount base 103, so that the common cutting unit 107 is movable between the upstream and downstream machining stations 52, 53 in the pit P.

The workpiece mount base 103 in the upstream machining station 52 can be inverted about a pair of shafts (not shown) rotatably supported by a pair of bearings 108a, 108b, respectively. The downstream machining station 53 has a workpiece mount base 104 (see FIG. 10) that can be inverted about a pair of shafts (not shown) rotatably supported by the bearing 108b and a bearing 109a, respectively. The bearing 108b that is shared by the workpiece mount bases 103, 104 may be fixedly positioned out of the way of a foam block W that is in the inverted position Wa and a cutting unit 107. As shown in FIG. 10, the workpiece mount base 104 in the downstream machining station 53 is invertable as with the first embodiment.

As illustrated in FIG. 9, a pair of rails 110 is mounted on the floor on opposite sides of the machining cavity 100 and extends along the workpiece feed path. Grippers 112 for gripping a foam block therebetween are mounted on respective transfer bodies 111 that are slidably mounted on the rails 110.

The machining apparatus according to the third embodiment shown in FIGS. 8 through 10 operates in the same manner as the machining apparatus according to the second embodiment.

More specifically, a foam block W is fixedly supported on the workpiece mount base 103 in the upstream machining station 52 and inverted into the inverted position Wa. In the inverted position Wa, the lower side of the foam block W is cut by the cutting unit 107. Thereafter, the lifter 102 is elevated to lift the workpiece mount base 103 to the two-dot-and-dash-line position in FIG. 8.

Then, as shown in FIG. 9, the elevated foam block W in the inverted position Wa is gripped by the grippers 112, and transferred into the downstream machining station 53 in which the foam block W is fixed to the workpiece mount base 104. The workpiece mount base 104 is inverted to bring the foam block W into the inverted position Wb in which the other side of the foam block W is cut by the cutting unit 107 which has been shifted to the downstream machining station 53, as shown in FIG. 10.

A chip discharger is located below the pit P and extends obliquely upwardly for discharging chips.

To prevent chips from scattering around, the machining cavity 100 is closed by the workpiece mount bases 103, 104 or foam blocks W fixedly mounted thereon.

The cylinder units 66a, 66b in the second embodiment and the lifter 102 in the third embodiment may be positioned and/or oriented as desired, and the transfer units in the second and third embodiments may be of any desired structure other than the illustrated structure.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. An apparatus for machining a foam block into an expendable lost foam pattern for use in full-mold casting, comprising:

mount means for supporting and orienting a foam block;

a pit defining a cavity below said positioning means; and cutting means disposed in said cavity, for cutting, from below, the foam block supported and oriented by said mount means, said cutting means having three degrees of freedom with respect to said mount means.

2. An apparatus according to claim 1, further including discharging means beneath said cavity, for discharging chips produced when the foam block is cut by said cutting means.

3. An apparatus according to claim 1, wherein said mount means comprises a workpiece mount base for placing the foam block thereon, said workpiece mount base including fixing means for fixing the foam block, and an inverting mechanism for inverting said workpiece mount base about an axis.

4. An apparatus according to claim 3, wherein said cavity is substantially closable by said workpiece mount base or the foam block placed on said workpiece mount base.

5. An apparatus according to claim 1, comprising a plurality of pits each defining said cavity, and a plurality of machining stations disposed in said pits, respectively, each of said machining stations comprising said cutting means.

6. An apparatus according to claim 5, further including means in at least one of said machining stations, for vertically moving the foam block, and transfer means interconnecting adjacent ones of said machining stations, for transferring the foam block between said adjacent machining stations.

7. An apparatus according to claim 6, wherein said pits are joined to each other with the cavities being combined into a common cavity, said machining stations being disposed in said common cavity.

* * * * *